J. MARTIN.
Sled.
No. 95,125.
Patented Sept. 21, 1869.
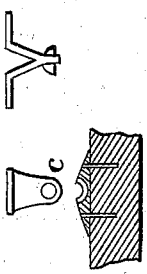
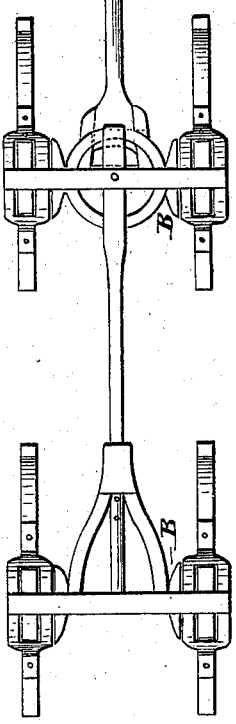
Witnesses:
Inventor:

United States Patent Office.

JAMES MARTIN, OF CHESTERFIELD, OHIO.

Letters Patent No. 95,125, dated September 21, 1869.

IMPROVEMENT IN SLEDS.

The Schedule referred to in these Letters Patent and making part of the same.

*To all whom it may concern:*

Be it known that I, JAMES MARTIN, of the township of Chesterfield, in the county of Fulton, and State of Ohio, have invented a new and useful Improvement in the Manner of Constructing Sleighs or Sleds, sometimes called Double "Bob-Sleds," said sleighs or sleds being used as vehicles of conveyance, and of very general use and utility in such countries and at such times as the surface of the earth is covered with snow; and I do hereby declare that the following is a full and exact description thereof, reference being had to the accompanying drawings, and to the letters of reference marked thereon, which drawings are made a part of this specification.

The nature of my invention consists in the attachment of the knee, that supports the beam upon which the load to be moved or transported rests, to the runner or base resting upon the ground by a socket-joint, thus enabling each runner or base, when passing an inequality or obstruction found in its path, to assume a position independent of, and not controlled by, the position at that time occupied by the opposite and corresponding runner or base, thus reducing the amount of power necessary to move a given weight over an uneven surface, and avoiding the strain incident to a sleigh or sled as usually constructed with stiff joints.

Also, a circular bar of iron or other metal, divided longitudinally about two-thirds of its length, more or less, through its centre, the ends of said circular bar being firmly attached to the runner or base of said sleigh or sled at equal distances in front and rear of the attachment by socket-joint before mentioned, and the two halves of said circular bar passing through grooves in or upon the beam as before mentioned, said circular bar being thus constructed, placed, and attached for the purpose of holding the socket-joint before spoken of in its place, and also to retain the runner in its proper position.

Also, a brace of iron or other metal, corresponding in its circular form with the circular bar before described, and firmly attached to the beam before spoken of, immediately adjoining and on the inner side of said circular bar, to be thus placed and attached, to further assist said circular bar in holding the runner or base in its proper position.

Figure 1 is a perspective view of the entire sled or sleigh.

Figure 2 exhibits that part of the socket-joint attached to the knee.

Figure 3 exhibits a metal plate containing the corresponding half of the above-named joint, and is attached to the runner.

Letter A represents the circular bar.

Letter B represents the brace; and

Letter c is the socket-joint.

What I claim as my invention, and desire to secure by Letters Patent, is—

The socket-joint c, in combination with the bar A and brace B, when constructed and operating substantially as and for the purposes specified.

JAMES MARTIN.

Witnesses:
D. MOURY,
HURON PEGG.